United States Patent
Fujimoto et al.

(10) Patent No.: US 6,992,448 B2
(45) Date of Patent: Jan. 31, 2006

(54) MOTOR CONTROL APPARATUS

(75) Inventors: Chiaki Fujimoto, Tokyo (JP);
Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/895,906

(22) Filed: Jul. 22, 2004

(65) Prior Publication Data

US 2005/0162113 A1    Jul. 28, 2005

(30) Foreign Application Priority Data

Jan. 28, 2004    (JP) .............................. 2004-020079

(51) Int. Cl.
*H02P 6/08* (2006.01)

(52) U.S. Cl. ...................... 318/254; 318/432; 318/471; 388/934

(58) Field of Classification Search ................ 318/138, 318/254, 432–434, 439, 720–724, 798–802, 318/471–473; 388/903, 904, 909
See application file for complete search history.

(56) References Cited

U.S. PATENT DOCUMENTS

| | | | |
|---|---|---|---|
| 4,451,771 A * | 5/1984 | Nagase et al. ............... | 318/800 |
| 5,038,092 A * | 8/1991 | Asano et al. ................ | 318/811 |
| 5,140,248 A * | 8/1992 | Rowan et al. ............... | 318/811 |
| 6,300,741 B1 * | 10/2001 | Okuyama .................... | 318/799 |
| 6,838,844 B2 * | 1/2005 | Shimizu et al. ............. | 318/287 |
| 6,861,813 B2 * | 3/2005 | Yoshimoto et al. ......... | 318/432 |

FOREIGN PATENT DOCUMENTS

JP    2002-238293 A    8/2002

OTHER PUBLICATIONS

B.P. Lathi;"Signal Processing and Linear Systems", Berkeley Cambridge Press, 1998. Section 9.1 describes Discrete-Time System equations.*

* cited by examiner

*Primary Examiner*—Bentsu Ro
(74) *Attorney, Agent, or Firm*—Sughrue Mion, PLLC

(57) ABSTRACT

A motor control apparatus capable of protecting a motor from overheat while changing smoothly a motor output characteristic as a function of time lapse and mitigating overhead involved in arithmetic operation includes a current command value generator for generating current command values for a motor (1) having a polyphase winding, and motor current value detecting circuits (3u, 3v) for detecting motor current values (iu, iv), to drive the motor (1) on the basis of the motor current values and current command values. The apparatus further includes a PWM inverter (4) for driving the motor (1) and a microcontroller (5) for controlling the PWM inverter (4). The microcontroller (5) limits the motor current values in dependence on integrated values of function values determined by fitting transformed current values determined through predetermined coordinate transformation of the phase currents (iu, iv, iw) to a predetermined function.

43 Claims, 7 Drawing Sheets

MOTOR CONTROL APPARATUS

BACKGROUND OF THE INVENTION

1. Field of the Invention

The present invention generally relates to a motor control apparatus for driving an electric motor on the basis of motor current values and current command values. More particularly, the present invention is concerned with a motor control apparatus which is imparted with an overheat protection function for a polyphase motor such as a DC brushless motor or the like (hereinafter simply referred to as the motor).

2. Description of Related Art

As the conventional motor control apparatus known heretofore, there has been proposed a control apparatus equipped with a temperature protecting means for the motor. By way of example, reference may have to be made to e.g. Japanese Patent Application Laid-Open Publication No. 238293/2002 (JP-A-2002-238293).

In the conventional motor control apparatus, it is necessary to execute an integration arithmetic operation on the basis of a predetermined function for each of phase currents. Consequently, overhead involved in the arithmetic processing increases remarkably, imposing an excessively large processing load on a microcomputer or microprocessor, giving rise to a problem.

SUMMARY OF THE INVENTION

It is therefore an object of the present invention to solve the problem mentioned above by providing a motor control apparatus which is capable of reducing or mitigating the processing load by rendering it unnecessary to perform arithmetic operations on a phase-by-phase basis while ensuring overheat protection for the motor as well as generation of smooth output torque.

In view of the above and other objects which will become apparent as the description proceeds, there is provided according to a general aspect of the present invention a motor control apparatus which includes a current command value generating means for generating current command values for a motor having a polyphase winding assembly, and a motor current value detecting means for detecting phase currents flowing through the motor as motor current values, wherein the motor control apparatus is so designed as to drive the motor on the basis of at least the motor current values and the current command values.

The motor control apparatus mentioned above further includes a current parameter limiting means designed for limiting current parameters relating to the motor current values under predetermined conditions.

The current parameter limiting means is so designed as to limit the current parameters in dependence on integrated values of function values determined by fitting the motor current values or alternatively transformed current values determined through coordinate transformation of the current command values to a predetermined function.

By virtue of the arrangement of the motor control apparatus described above, the processing load can be reduced with the arithmetic operation on the phase-by-phase basis being rendered unnecessary while ensuring overheat protection for the motor as well as generation of smooth output torque.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
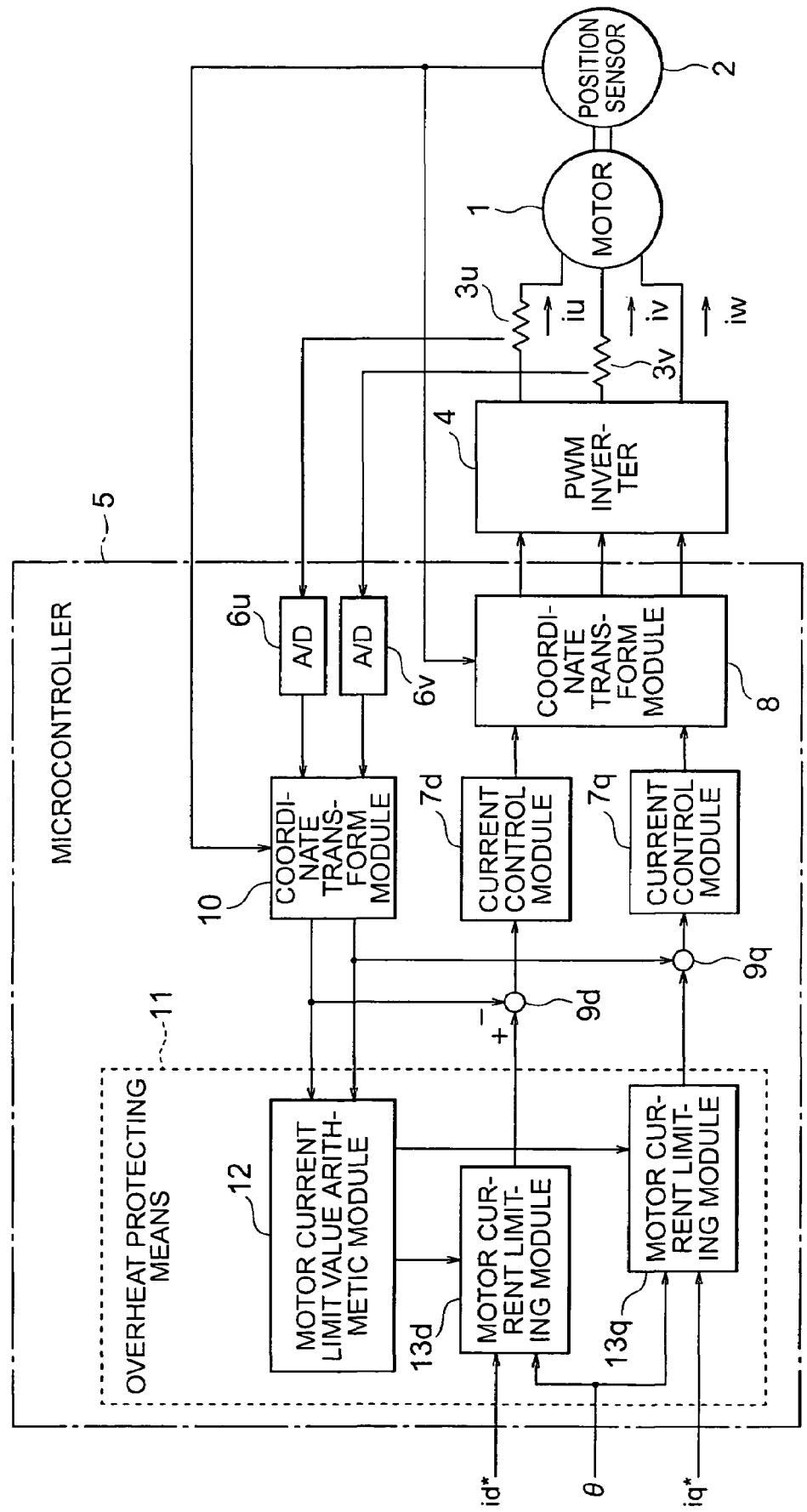
FIG. 1 is a block diagram showing a structure of the motor control apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing a structure of the motor control apparatus according to a first embodiment of the present invention. Referring to the figure, a motor 1 having a three-phase (U, V, W) winding assembly is provided with a position sensor 2 and current detecting circuits (transducers) 3u and 3v. The motor 1 is connected to a PWM (Pulse Width Modulation) inverter 4.

The position sensor 2 is designed for detecting the magnetic pole positions of a rotor of the motor 1, while the current detecting circuits 3u and 3v are designed to detect phase currents iu and iv, respectively, of the motor 1. Incidentally, the current detecting circuit for detecting the phase current iw is spared because the phase current iw can automatically be determined on the basis of the two phase currents iu and iv.

The motor 1 is supplied with the phase currents iu, iv and iw from the PWM inverter 4 to be driven under the PWM control.

The signal indicative of the magnetic pole positions of the rotor detected by the position sensor 2 and the phase currents iu and iv detected by the current detecting circuits 3u and 3v, respectively, are inputted to a microcontroller 5 which may be constituted by a microprocessor or microcomputer.

The microcontroller 5 is comprised of A/D (Analog-to-Digital) converters 6u and 6v, current control modules 7d and 7q, coordinate transform modules 8 and 10, subtraction modules 9d and 9q, an overheat protecting means 11 (current parameter limiting means) and a torque control means (not shown).

The torque control means incorporated in the microcontroller 5 is designed to generate a torque command for the motor 1 to effectuate the torque control of the motor 1 in response to the torque command by resorting to a vector control which can be realized with the aid of a two-phase rotation flux coordinate system consisting of a d-axis extending in the direction coinciding with that of the field current of the motor 1 and a q-axis extending in the direction orthogonal to the direction of the d-axis.

In the microcontroller 5, the components thereof except for the A/D converters 6u and 6v are realized softwarewise. The A/D converters 6u and 6v serve for converting the detected phase currents iu and iv into digital values, respectively, to thereby generate digital signals to be inputted to the coordinate transform module 10 incorporated in the microcontroller 5. In addition, the signal indicative of rotor magnetic pole positions detected by the position sensor 2 is also inputted to the coordinate transform module 10.

The current control modules 7d and 7q are designed to control through a feedback control the d- and q-axis components, respectively, of the motor current on the d-q coordinate system, the d- and q-axis current components being then inputted to the coordinate transform module 8 provided for the PWM control. On the other hand, the coordinate transform module 8 is designed to transform the output signals of the current control modules 7d and 7q, respectively, to three-phase AC coordinate values from the d- and q-coordinate values, to thereby generate driving control signals which are then inputted to the PWM inverter 4.

The subtraction modules 9d and 9q are designed to arithmetically determine differences or deviations between the output signals of the motor current limiting modules 13d and 13q, respectively, of the overheat protecting means 11 and the output signals (coordinate-transformed current values) of the coordinate transform module 10, respectively, to thereby output the difference or deviation signals which are then inputted to the current control modules 7d and 7q, respectively.

The coordinate transform module 10 is designed to transform the U-phase current iu and the V-phase current iv detected by the current detecting circuits 3u and 3v, respectively, to the d- and q-coordinate values from the three-phase AC coordinate values. The current values resulting from the coordinate transformation are then inputted to the subtraction modules 9d and 9q, respectively, and the motor current limit value arithmetic module 12 constituting a part of the overheat protecting means 11.

A d-axis target current value id* and a q-axis target current value iq* are inputted to the motor current limiting modules 13d and 13q, respectively, of the overheat protecting means 11 from external equipment (not shown). Additionally inputted to the motor current limiting modules 13d and 13q is a signal which represents a phase angle θ formed between the q-axis and a composite vector current value is (i.e., composite vector value of the d-axis current value id and the q-axis current value iq). This phase angle θ will hereinafter be referred to as the current phase angle θ only for the convenience of description.

The overheat protecting means 11 serves as the means for limiting the motor current values (current parameters). More specifically, the overheat protecting means 11 is so arranged as to limit the motor current values in dependence on integrated values of functional values obtained by fitting the motor current values or the coordinate-transformed current values derived from the coordinate transformation of the current command values to a predetermined function.

As can be understood from the above, the overheat protecting means 11 is composed of the motor current limit value arithmetic module 12 and the motor current limiting modules 13d and 13q in order to protect not only the motor 1 but also the control apparatus for the motor 1 as a whole (inclusive of the PWM inverter 4 and the microcontroller 5) from overheating.

Further, the motor current limit value arithmetic module 12 incorporates therein a means or capability of gradually reducing or increasing the limit values (maximum current values).

More specifically, the motor current limit value arithmetic module 12 is so designed as to arithmetically determine the motor current limit values (maximum current values) on the basis of the integrated values of the function values determined by fitting the coordinate-transformed current values resulting from the coordinate transformation to the d- and q-coordinates by the coordinate transform module 10, the motor current limit values as determined being then inputted to the motor current limiting modules 13d and 13q, respectively. In this manner, the maximum current values of the motor current values can be limited in dependence on the integrated values of the function values arithmetically derived by fitting the time-average values of the d- and q-coordinate current values id and iq resulting from the coordinate transformation of the phase currents iu, iv and iw to the predetermined function.

Further, the motor current limiting module 13d is so designed as to limit the motor current value to be smaller than a predetermined maximum current value inclusive in accordance with the motor current limit value supplied from the motor current limit value arithmetic module 12 while taking into account the d-axis target current value id* and the current phase angle θ supplied from external equipment (not shown).

Similarly, the motor current limiting module 13q is so designed as to limit the motor current value to be smaller than the predetermined maximum current value inclusive in accordance with the motor current limit value supplied from the motor current limit value arithmetic module 12 while taking into account the q-axis target current value iq* and the current phase angle θ inputted from the external equipment.

In other words, the motor current limiting modules 13d and 13q arithmetically determine the d-axis component of the motor current limit value as the d-axis current limit value while determining the q-axis component as the q-axis current limit value, respectively, in accordance with the current phase angle θ so that the current phase angle θ remains constant.

By limiting the d-axis target current value id* and the q-axis target current value iq* so as not to exceed the respective limit values determined as mentioned above, the current limitation on the d- and q-coordinate axes, respectively, can be realized.

Next, by reference to the flow chart shown in FIG. 2 together with FIGS. 3 to 5, description will be made of the operation of the motor control apparatus according to the first embodiment of the present invention, which operation is carried out in accordance with a program loaded or installed in the microcontroller 5.

Figure 2:
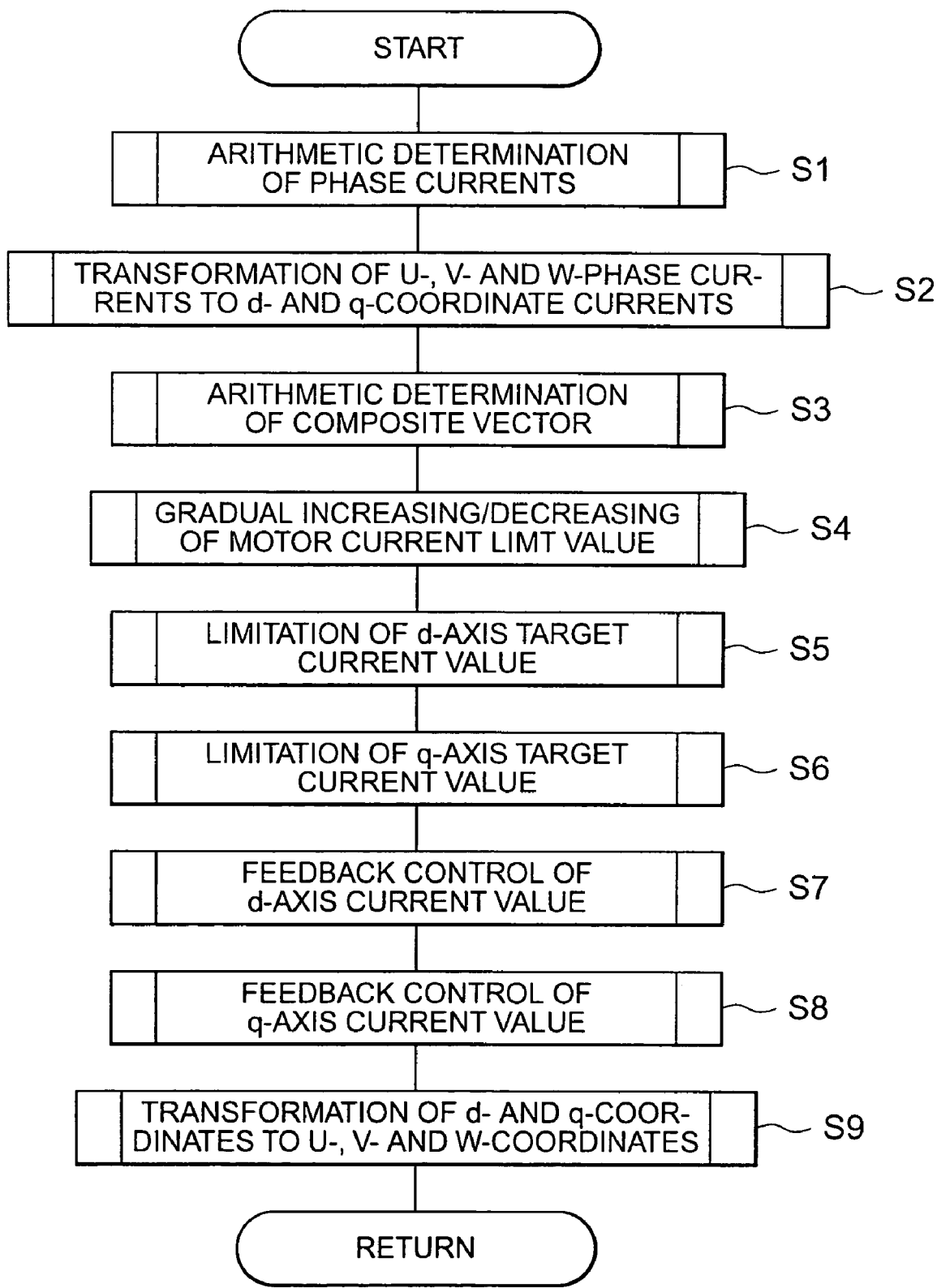
FIG. 2 is a flow chart for illustrating operation based on a program packaged in a microcontroller constituting a major part of the motor control apparatus according to the first embodiment of the present invention.

It is assumed that the program (or processing routine) shown in FIG. 2 is executed, being called periodically at a predetermined constant interval.

Figure 3:
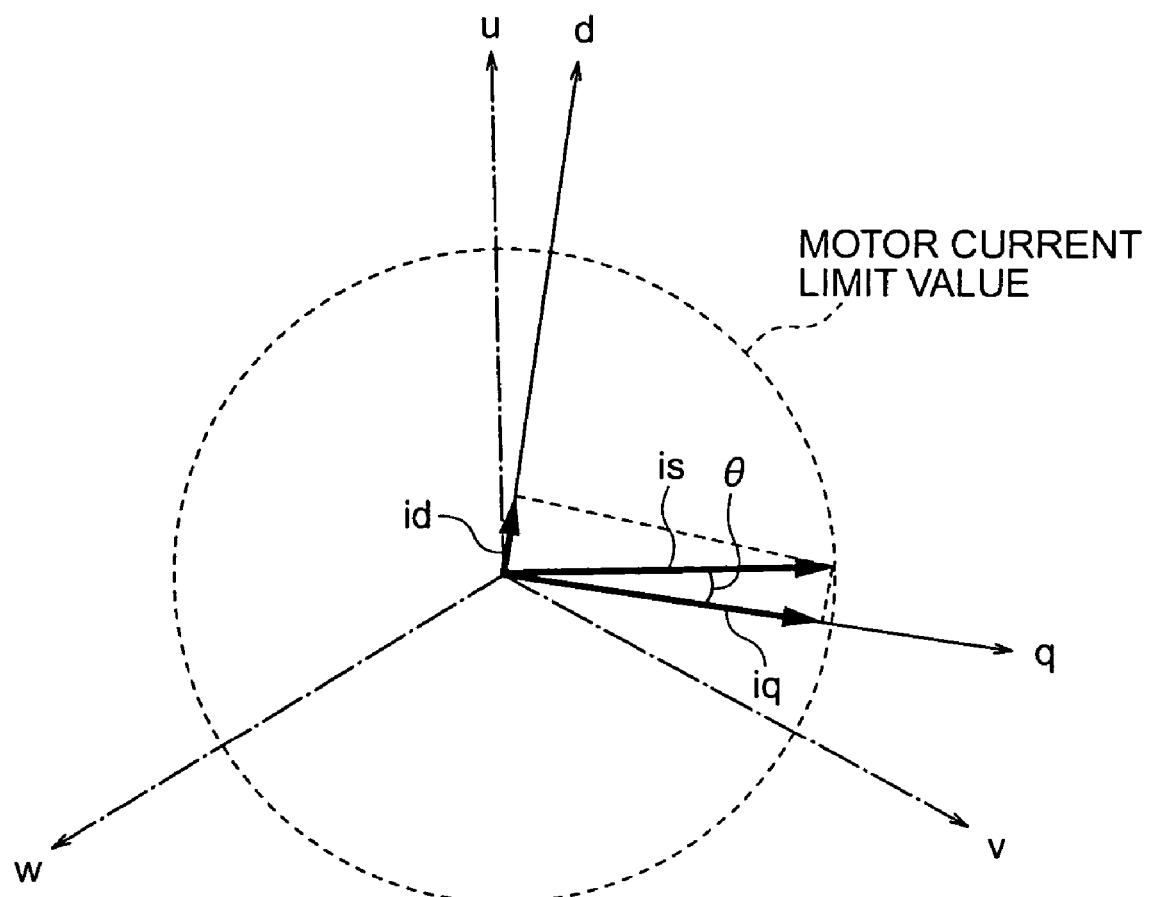
FIG. 3 is a diagram for illustrating current limit values according to the first embodiment of the present invention.

FIG. 3 is a current vector diagram illustrating relations among the d-axis current value id and the q-axis current value iq obtained as the result of the coordinate transformation from the U-, V- and W-phase currents, the composite vector current value is of the d-axis current value id and the q-axis current value iq and the motor current limit values (represented by a broken line circle). FIG. 4 is a view for illustrating characteristics of the composite vector current value is taken along the abscissa and change rate of the motor current limit value taken along the ordinate. Further, FIG. 5 is a view for illustrating change of the motor current value (d- or q-axis current limit value).

At this juncture, it is assumed that the d-axis target current value id* and the q-axis target current value iq* are supplied externally (i.e., from other equipment), as mentioned hereinbefore.

Further, it should also be mentioned that the two phase currents (i.e., the U-phase current iu and the V-phase current iv) of the U-, V- and W-phase currents iu, iv and iw of the motor 1 are converted to corresponding voltage signals by means of the current detecting circuits (transducers) 3u and 3v, respectively, to be inputted to the microcontroller 5. The inputted voltage signals corresponding to the phase currents iu and iv are digitized by the A/D converters 6u and 6v, respectively, the resulting digital values or signals being then transferred to the software processing routine.

Now, referring to FIG. 2, the coordinate transform module 10 arithmetically determines the phase current iw on the basis of the phase currents iu and iv in accordance with the undermentioned expression (1), whereby the three phase currents iu, iv and iw are determined (step S1).

$$iw = -iu - iv \tag{1}$$

where the U-phase current iu is derived from the detection value outputted from the current detecting circuit 3u while the V-phase current iv is derived from the detection value outputted from the current detecting circuit 3v. As is obvious from the expression (1), the W-phase current iw can arithmetically be determined on the basis of the detection values outputted from the current detecting circuits 3u and 3v, respectively.

In succession, the coordinate transform module 10 transforms the U-, V- and W-phase currents iu, iv and iw as determined to the current values on the d-q coordinate system consisting of d- and q-axes (refer to FIG. 3), whereby the transformed current values (i.e., the d-axis current value and the q-axis current value) are outputted from the coordinate transform module 10 (step S2).

Subsequently, in a step S3, the motor current limit value arithmetic module 12 incorporated in the overheat protecting means 11 arithmetically determines the composite vector current value is of the d-axis current value id and the q-axis current value iq in accordance with the undermentioned expression (2) in a step 3.

$$is = \overline{\sqrt{id^2 + iq^2}} \tag{2}$$

At this juncture, it is presumed that the composite vector current value is constant. Then, the end point of the composite vector current value is exists on the broken line circle shown in FIG. 3. This in turn means that the result of the composition of the U-, V- and W-phase currents represents a constant current value.

The current value mentioned above undergoes no influence of the current phase angle θ (motor position) and represents the magnitude of the composite vector making appearance in the two-axis (d-q) coordinate transformation or the vector sum of the phase currents flowing through the motor 1. Thus, the current value mentioned above can be represented by the value of the current supplied to or flowing through the motor 1.

Figure 4:
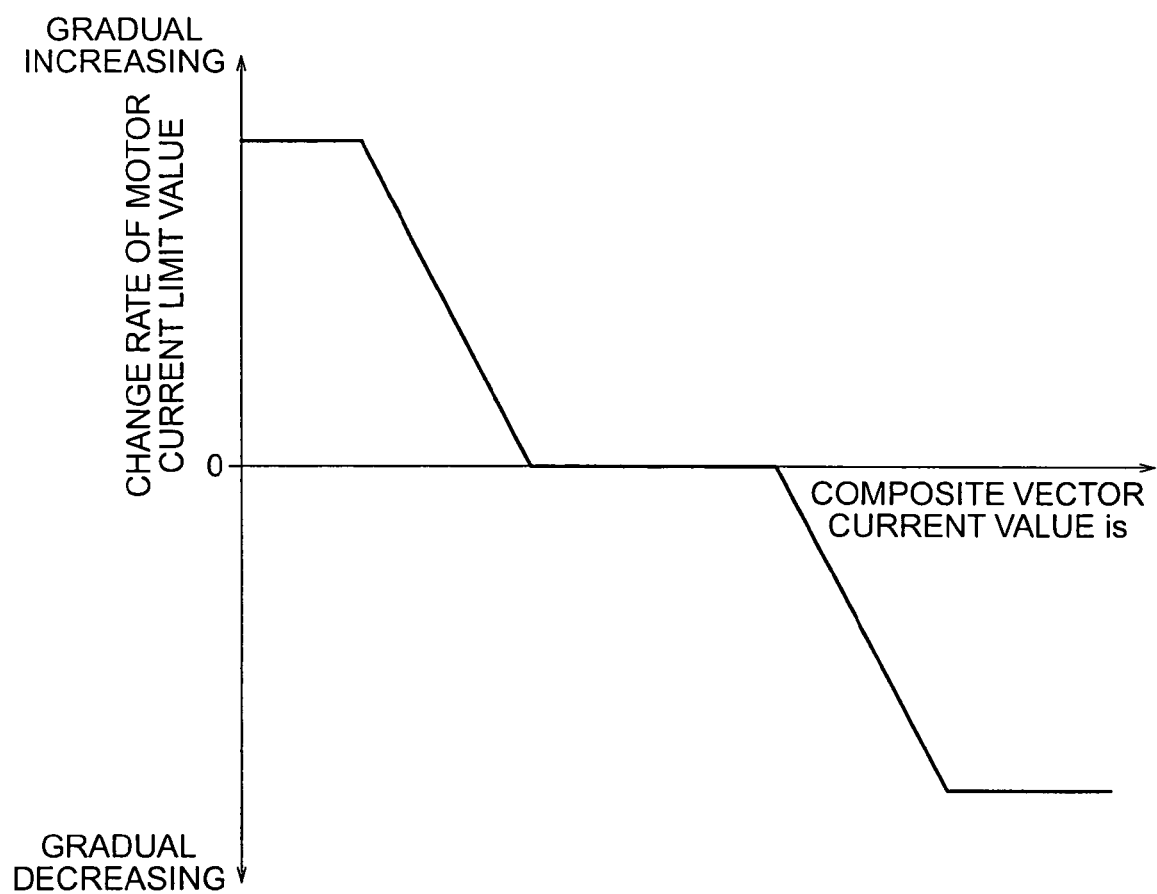
FIG. 4 is a view illustrating characteristics of motor current values increasing or decreasing gradually in the motor control apparatus according to the first embodiment of the present invention.

In a step S4, the motor current limit value arithmetic module 12 arithmetically determines the motor current limit value by gradually decreasing or increasing the maximum current value permissible for the motor 1 (i.e., motor current limit value) in accordance with the composite vector current value is on the basis of e.g. the characteristic illustrated in FIG. 4.

Figure 5:
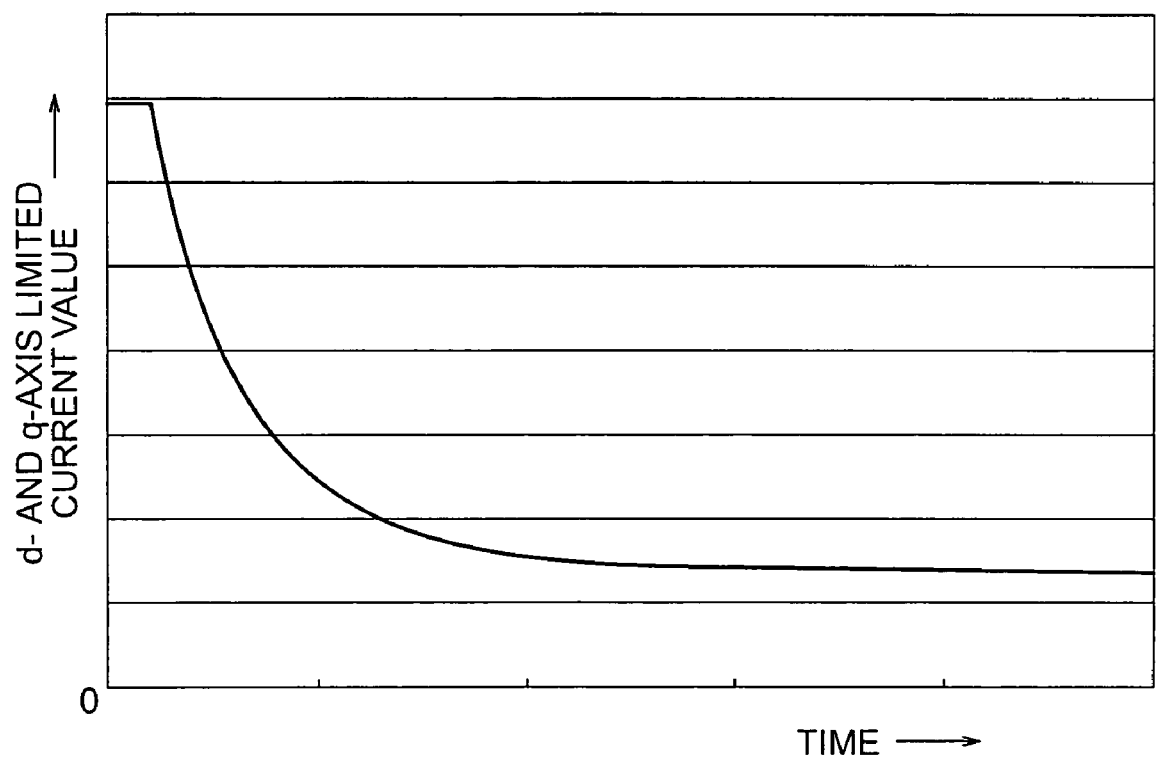
FIG. 5 is a view for illustrating a waveform of a motor current value in the motor control apparatus according to the first embodiment of the present invention.

An example of the current limiting operation based on the processing mentioned just above is graphically illustrated in FIG. 5.

By limiting the motor current value on the basis of the composite vector current value is, as described above, protection of most heat-susceptible portion of the motor against overheating can be ensured without disturbing balance of the three phase currents of the motor.

The motor current limit values arithmetically determined by the motor current limit value arithmetic module 12 serves for limiting the d-axis target current value id* and the q-axis target current value iq*. Consequently, the motor current can gradually be decreased without disturbing the balance of the phase currents because the current limitation is effectuated in precedence to the coordinate transformation to the individual phases (U-, V- and W-phases) in the coordinate transform module 8.

Besides, it is not required to perform the arithmetic operation for each of the phase currents iu, iv and iw. In other words, the arithmetic operation can be realized on the basis of only the representative value of the current flowing through the motor 1 (i.e., the composite vector current value is). Thus, the current limiting procedure can be simplified, whereby the processing load (overhead) imposed on the microcontroller 5 can be mitigated.

Subsequently, the motor current limiting module 13 incorporated in the overheat protecting means 11 limits the d-axis target current value id* and the q-axis target current value iq* on the basis of the motor current limit value (steps S5 and S6) in order to limit the motor current value through the motor current value control on the d-q coordinate system.

Now, referring to FIG. 3, description will be made in detail of the current limiting processing (steps S5 and S6) on the d-q coordinate system as executed by the motor current limiting modules 13.

As described previously, the motor current limit value outputted from the motor current limit value arithmetic module 12 limits the d- and q-axis current values and hence the composite vector current value is.

In this conjunction, the motor current limiting modules 13 serving as the maximum current limiting means determines the d-axis current component of the motor current limit value as the d-axis current limiting value while determining the q-axis current component of the motor current limit value as the q-axis current limit value in accordance with the current phase angle θ so that the current phase angle θ supplied externally remains constant.

By limiting the d-axis target current value id* and the q-axis target current value iq* so that they do not exceed the d-axis current limit value and the q-axis current limit value mentioned above, respectively, the current limitation can be realized on and along the d-axis and the q-axis of the d-q coordinate system.

Finally, the coordinate transform module 8 cooperates with the subtraction modules 9d and 9q and the current control modules 7d and 7q to carry out the feedback control of the d-axis current value id (step S7) and the q-axis current value iq (step S8) in accordance with the d-axis target current value and the q-axis target current value which are limited so as not to exceed the relevant predetermined values (i.e., the d-axis current limit value and the q-axis current limit value), respectively, as mentioned above and at the same time transform the control signals (control quantities) supplied from the current control modules 7d and 7q, respectively, to the three-phase AC coordinate signals to thereby control the operation of the PWM inverter 4.

In other words, in the steps S7 and S8, the subtraction modules 9d and 9q which are provided in association with the coordinate transform module 8 compare the d-axis detection current and the q-axis detection current resulting from the coordinate transformation of the detected values of the phase currents, respectively, with the limited d- and q-axis target current values, respectively, while the current control modules 7d and 7q carry out the feedback control of the d-axis current and the q-axis current through the PI control (proportionalplus-integral control).

Finally, in the step S9, the coordinate transform module 8 drives the PWM inverter 4 with the control signals resulting from the transformation to the three-phase AC coordinates.

In this way, the voltages are applied across the individual phase windings of the motor 1 to cause the phase currents to flow through the motor 1.

By virtue of the control procedure described above, the motor currents on the d- and q-coordinate axes are limited smoothly as a function of the time lapse, as illustrated in FIG. 5, whereby proper overheat protection can be realized without incurring rapid change in the output torque of the motor 1.

At this juncture, it should be mentioned that although it has been described that the motor current value is limited on the basis of the integrated value obtained by integrating the composite vector current value is intactly, the motor current value may also be limited on the basis of the integrated value obtained by integrating the function value by fitting the composite vector current value to a power function adopted as the predetermined function. Of course, the predetermined function is not restricted to the power function but other appropriate function can be adopted as the predetermined function as occasion requires.

In general, loss included in the motor 1 or the PWM inverter 4 is approximately proportional to the first power or second power (or square) of the current value. Accordingly, by using the function value determined by fitting the composite vector value of the first power sum or square sum of the d- and q-axis current values to the power function, more proper overheat protection can be realized.

As the power function, there may be mentioned various ones, as exemplified below.

$$f1(i)=i^{1.5}$$

$$f2(i)=i^2$$

$$f3(i)=i^{1.5}+a \quad (3)$$

where f1(i), f2(i) and f3(i) represent the power functions, respectively, i represents the motor current value and a represents a given or optional constant.

When the function f2(i) is adopted, the motor current value i is replaced by the composite vector current value is, whereby the expression (3) can be represented by the undermentioned expression (4):

$$f2(is)=id^2+iq^2 \quad (4)$$

By adopting the function f2(is) given by the above-mentioned expression (4), the arithmetic expression can be simplified, whereby the processing load imposed on the microcontroller 5 can further be mitigated.

Furthermore, by adopting a polynomial approximation or polygonal-line approximation of the power function, the load or overhead involved in the arithmetic operation can significantly be reduced.

Moreover, by implementing the power function in the form of a table to be referenced (i.e., as the table referencing) to thereby allow the whole or part of the above-mentioned arithmetic expression to be determined by referencing the table, the amount of arithmetic operation can be reduced.

The d-axis current id is ordinarily employed for the field-weakening control and is smaller than the q-axis current iq in many cases. Accordingly, in the case where the d-axis current value id is substantially zero, the composite vector current value is can be represented by a simplified expression as follows:

$$is=id+iq \quad (5)$$

By representing the composite vector current value is by the simplified expression (5), the amount of arithmetic operation of the microcontroller 5 and hence the load imposed thereon can further be reduced.

Besides, when the motor control is to be performed efficiently, the d-axis current is ordinarily so controlled as to be zero. In that case, no d-axis current flows through the motor. Accordingly, the composite vector current value is can be regarded as being represented by the q-axis current value iq only. On the other hand, in the case of the motor control where the q-axis current iq is substantially zero, it can duly be regarded that the composite vector current value is is given by only the d-axis current value id.

Furthermore, in the case of the control that the d-axis current id and the q-axis current iq are alternately changed over, the maximum value of the d-axis current value id and the q-axis current value iq may be selected as the composite vector current value is.

In other words, of the integrated values of the function values arithmetically determined from the motor current values iu, iv and iw or the transformed current values id and i, the integrated value for which it is decided that the current flowing through the motor 1 is larger than a predetermined value may be selected as the value for limiting the motor current value.

Further, the current limit values may be set for the d-axis current value i and the q-axis current value iq, respectively, as illustrated in FIG. 5.

Besides, although it has been mentioned that d-axis current value id and the q-axis current value iq are directly detected to determine the composite vector current value is, the composite vector current value is may be determined after summing the absolute values of the d- and q-axis current values, respectively, over a predetermined time period periodically at a predetermined interval in order to smooth the absolute values of the d- and q-axis current values, respectively, as a function of time lapse.

Furthermore, in place of integrating the detected d- and q-axis current values, the target values of the d- and q-axis currents may be integrated.

This can also be applied to the motor control apparatus which is not provided with the current detecting circuit for each of the phase currents as in the case of the open-loop control or the like.

In the foregoing description, it has been assumed that the object for control is a three-phase DC brushless motor. It should however be understood that the teachings of the present invention can equally be applied for the overheat protection of other types of polyphase motor such as an induction motor.

Further, the current phase angle θ supplied from external equipment need not necessarily be changed in precedence and succession to the limitation of the motor current value.

In the case where the current phase angle θ is changed before and after the limitation of the motor current value, there can be conceived a method of causing the d-axis current id to flow through the motor with priority or preference over the q-axis current iq while limiting the composite vector current value is so as not to exceed the predetermined value on one hand and a method of causing the q-axis current iq to flow through the motor with preference over the d-axis current id while limiting the composite vector current value is as mentioned above on the other hand.

By way of example, when the motor 1 is a DC brushless motor, the field-weakening action or effect can be realized by causing the d-axis current id to flow in the negative (minus) direction. Thus, by causing the d-axis current id to flow with priority or preference, the driving control of the motor 1 with preference being put on the rotation speed can be effectuated.

When the field intensity of the motor 1 is constant, the q-axis current iq is in proportion to the output torque of the motor 1. Accordingly, by causing the q-axis current iq to flow with preference over the d-axis current, the driving control of the motor 1 can be realized with preference being put on the output torque.

On the other hand, in the case where the current phase angle θ is not changed in precedence and succession to the limitation of the motor current value, the motor current value can be limited while allowing the rotation speed and the output torque of the motor 1 to be gradually decreased in balance with each other.

Further, this control is suited for the motor such as the induction motor where the magnetic flux is controlled with the exciting current.

Furthermore, in the foregoing description, it has been assumed that the motor 1 (DC brushless motor) is controlled on the d-q coordinate system. However, when the motor 1 is an induction motor, the control may also be carried out on the γ-δ coordinate system by gradually decreasing both the γ-axis rotor linkage flux and the δ-axis stator current in a uniform manner.

Embodiment 2

In the case of the motor control apparatus according to the first embodiment of the present invention, the current feedback control of the motor is performed on the d-q coordinate system by making use of the transformed current values id and iq. A second embodiment of the present invention is directed to a straightforward or direct feedback control of the motor by making use of the AC current values (phase currents iu, iv and iw). In this case, there can equally be ensured similar advantageous effects as in the case of the motor control according to the first embodiment of the invention.

Figure 6:
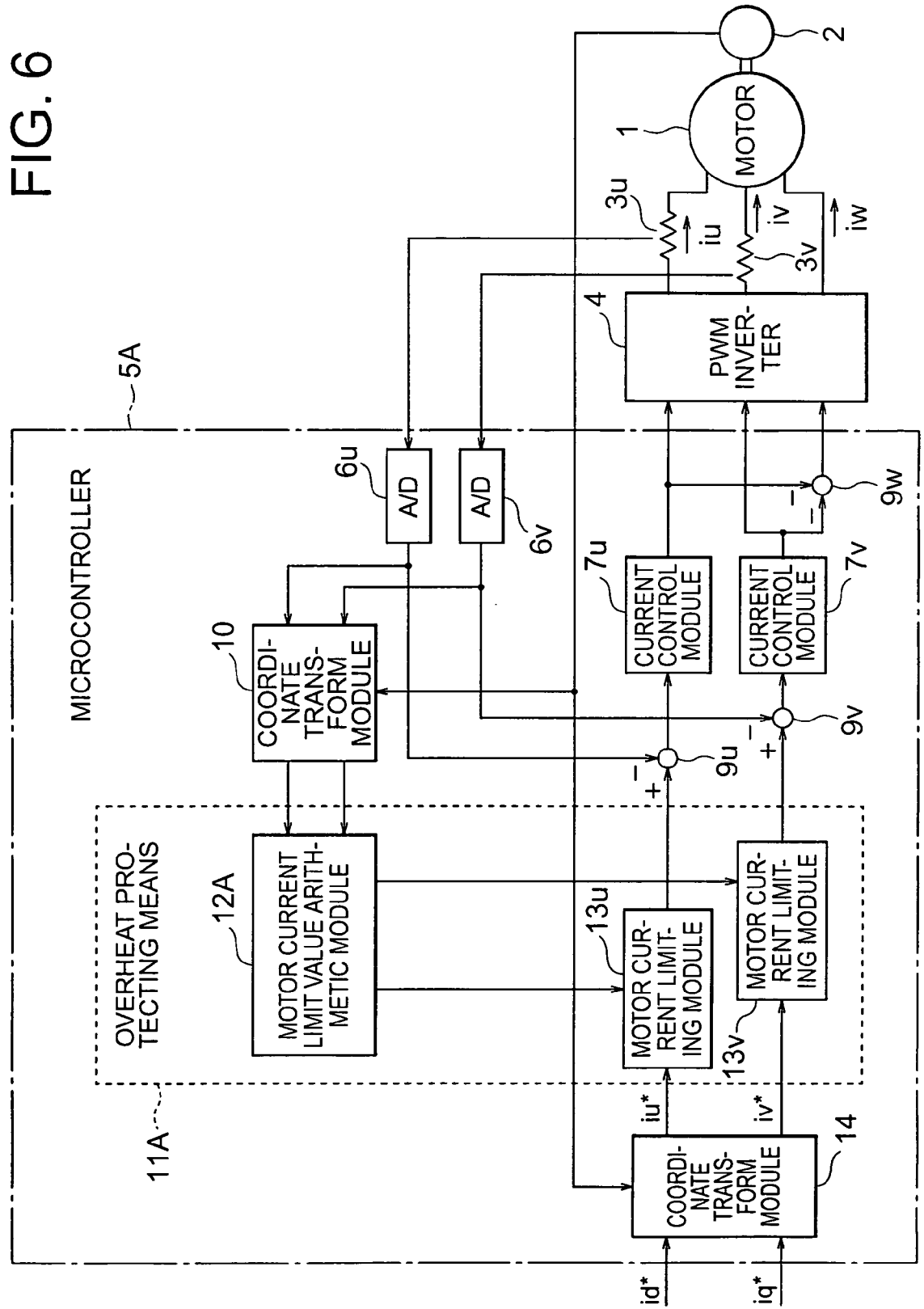
FIG. 6 is a block diagram showing an arrangement of the motor control apparatus according to a second embodiment of the present invention.

FIG. 6 is a block diagram showing an arrangement of the motor control apparatus according to the second embodiment of the present invention in which the AC currents (phase currents) are directly fed back. In the figure, components similar to those described hereinbefore by reference to FIG. 1 are denoted by like reference numerals affixed with or without "A" and repeated description thereof will be omitted.

Further, since the program to be packaged in the microcontroller 5A can be realized similarly to that described hereinbefore in conjunction with FIG. 2, illustration thereof is also omitted.

Referring to FIG. 6, the microcontroller denoted generally by 5A includes A/D converters 6u and 6v, current control modules 7u and 7v, subtraction modules 9u and 9v, an addition module 9w, coordinate transform modules 10 and 14 and an overheat protecting means 11A.

In the microcontroller 5A mentioned above, inputted directly to the subtraction modules 9u and 9v inserted on the input side of the current control modules 7u and 7v, respectively, are the signals indicative of the phase currents via the A/D converters 6u and 6v, respectively.

The addition module 9w adds together the output signals of the current control modules 7u and 7v, respectively, with negative (minus) polarities to output a W-phase control signal to the PWM inverter 4.

The coordinate transform module 14 is inserted between the input terminals for the d- and q-axis target current value signals and the overheat protecting means 11A for transforming the target current values id* and iq* on the d-q coordinate system into target current values iu* and iv* on the three-phase AC coordinate system. The signals indicative of the target current values iu* and iv* are inputted to the motor current limiting modules 13u and 13v, respectively, which are incorporated in the overheat protecting means 11A.

In the microcontroller 5A shown in FIG. 6, the coordinate transform module 14 is provided on the input side of the microcontroller 5A in place of the coordinate transform module 10 provided on the output side of the microcontroller described prviously by reference to FIG. 1.

Next, description will be made of operation performed by the motor control apparatus according to the second embodiment of the present invention, which is shown in FIG. 6.

At first, the coordinate transform module 10 derives from the U-, V- and W-phase currents the d- and q-axis current values through coordinate transformation on the basis of the phase currents detected via the A/D converters 6u and 6v, respectively, as described hereinbefore in conjunction with the first embodiment of the invention.

The motor current limit value arithmetic module 12A incorporated in the overheat protecting means 11A arithmetically determines the motor current limit values for limiting the peak or crest values of the three-phase AC currents on the basis of the d- and q-axis current values derived through transformation from the phase currents. The signals indicative of the motor current limit values as outputted from the motor current limit value arithmetic module 12A are inputted to the motor current limiting modules 13u and 13v, respectively.

On the other hand, the coordinate transform module 14 transforms the d-axis target current value id* and the q-axis target current value iq*, respectively, to the target current values iu* and iv* on the three-phase AC coordinate system. The target current values iu* and iv* derived from the coordinate transformation are inputted to the motor current limiting modules 13u and 13v, respectively.

Thus, the target current values iu* and iv* obtained through the coordinate transformation are directly compared with the motor current limit values, respectively, to be thereby limited so as not to exceed the predetermined crest values, respectively.

More specifically, the motor current limiting modules 13u and 13v serve to limit the crest values of the target current values iu* and iv* on the three-phase AC coordinate system so that the crest values remain to be smaller than the motor current limit values arithmetically determined by the motor current limit value arithmetic module 12A.

In succession, the subtraction modules 9u and 9v compare the target current values on the three-phase AC coordinate system whose crest values are limited by the motor current limiting modules 13u and 13v with the U- and V-phase detection currents iu and iv, respectively, whereon the difference signals resulting from the comparison are inputted to the current control modules 7u and 7v, respectively, whereon the difference signals resulting from the comparison are inputted to the current control modules 7u and 7v, respectively.

The current control modules 7u and 7v generate control signals for effectuating the feedback control of the motor current value through the PI (Proportional-plus-Integral) control. The addition module 9w adds together the control signals supplied from the current control modules 7u and 7v, respectively, to thereby generate the control signal for the W-phase.

The control signals (operation quantities) outputted from the current control modules 7u and 7v as well as the control signal outputted from the addition module 9w are supplied to the PWM inverter 4 for allowing the U-, V- and W-phase current to flow through the motor 1 for driving the same.

In this way, the crest values of the phase currents on the three-phase AC coordinate system are limited smoothly, as in the case of the motor control apparatus according to the first embodiment of the invention, whereby proper overheat protection can be realized without incurring sudden or rapid change of the output torque.

Embodiment 3

In the case of the motor control apparatuses according to the first and second embodiments of the invention, the maximum current value(s) is limited on the basis of the time-average values of the d- and q-axis current values derived through the coordinate transformation of the phase currents of the motor. A third embodiment of the present invention is directed to the motor control apparatus which is arranged to gradually decrease the maximum current value(s) on the basis of the differences between the predetermined threshold value TH and the current values id and iq derived through the coordinate transformation.

With the arrangement of the motor control apparatus according to the third embodiment of the invention, the motor current value can be limited at an earlier time point when the motor current value is large, while it can be controlled at a later time point when the motor current value is small, whereby there can be realized more effective overheat protection from the practical point of view.

Figure 7:
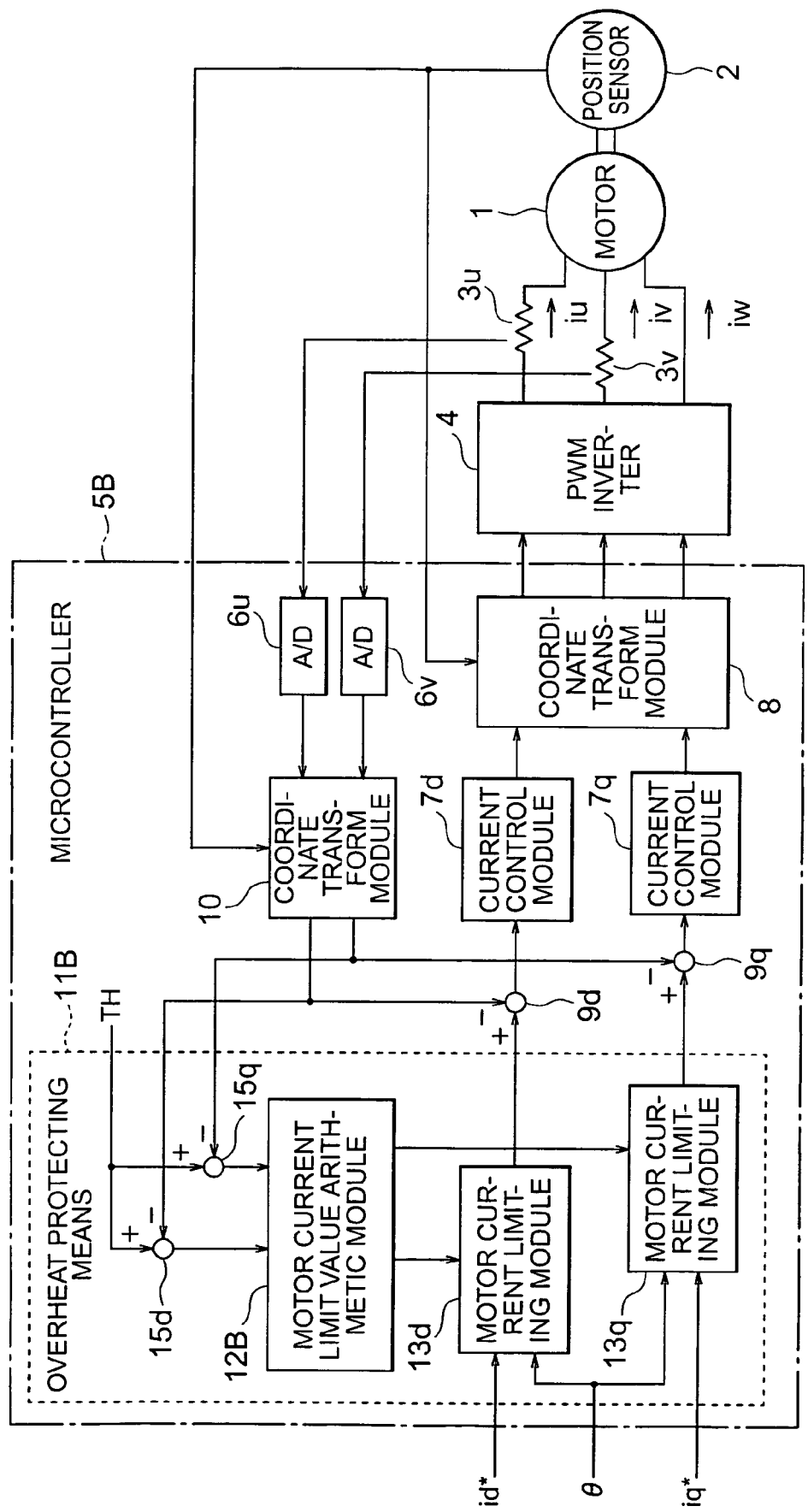
FIG. 7 is a block diagram showing an arrangement of the motor control apparatus according to a third embodiment of the present invention.

FIG. 7 is a block diagram showing an arrangement of the motor control apparatus according to the third embodiment of the present invention. In the figure, components similar to those described hereinbefore by reference to FIG. 1 are denoted by like reference numerals affixed with or without "B" and repeated description thereof will be omitted.

Further, since the program to be packaged in the microcontroller 5B can be realized similarly to that described hereinbefore in conjunction with the first embodiment of the invention, illustration thereof is also omitted.

Referring to FIG. 7, the microcontroller 5B includes a means for generating a predetermined threshold value TH referenced for making the overheat protection decision, although the threshold value TH generating means is omitted from illustration. The signal indicative of the threshold value TH is inputted to the overheat protecting means 11B.

The overheat protecting means 11B includes subtraction modules 15d and 15q which are inserted on the input side of the motor current limit value arithmetic module 12B.

The subtraction modules 15d and 15q are designed to compare with the threshold value TH the phase current values (transformed current values), respectively, which are derived through the d-q coordinate transformation performed by the coordinate transform module 10, to thereby arithmetically determine the differences between the threshold value TH on one hand and the d- and q-axis current values (transformed current values) on the other hand.

The overheat protecting means 11B is designed to gradually decrease the maximum current value(s) in accordance with the integrated value of the function values obtained by fitting the differences between the transformed current values id and iq and the threshold value TH to the predetermined function, to thereby limit the motor current value.

Next, referring to FIG. 7, description will be made of operation of the motor control apparatus according to the third embodiment of the present invention.

At first, the subtraction modules 15d and 15q incorporated in the overheat protecting means 11B compare the d- and q-coordinate current values obtained through the coordinate transformation performed by the coordinate transform module 10 with the threshold value TH, whereon the differences between the d- and q-axis current values and the threshold value TH are inputted to the motor current limit value arithmetic module 12B.

The motor current limit value arithmetic module 12B is designed to gradually increase or decrease the limit values allowable for the target d- and q-axis current values, respectively, on the basis of the maximum values of the differences as inputted in conformance with e.g. the characteristic illustrated in FIG. 4, whereby the motor current limiting modules 13d and 13q limit the relevant motor current values, respectively.

Now, presetting as the threshold value TH the current value which allows the continuous operation of the motor to be performed (hereinafter this current value is referred to as "rated continuous current value"), it is possible to flow a large current for a short period in conformance with short-period rating of the motor 1 and the PWM inverter 4 and to smoothly converge the motor current to the rated continuous current value in dependence on the driving conditions or situations.

In the case of the motor control apparatuses according to the instant embodiment of the invention, the maximum current value(s) is gradually increased or decreased on the basis of the differences between the transformed current values determined through the coordinate transformation and the threshold value TH, the motor control apparatus may be so arranged as to gradually increase or decrease the maximum current value(s) on the basis of the integrated value of the difference between the function value obtained by fitting the transformed current values to the power function and the predetermined threshold value set for the overheat protection.

Further, as described hereinbefore, loss included in the motor 1 or the PWM inverter 4 is approximately proportional to the first power or second power (or square) of the current value. Thus, more proper overheat protection can be realized.

Furthermore, it goes without saying that the motor control apparatus may also be so arranged as to gradually increase or decrease the maximum current value(s) on the basis of the function value obtained by fitting to the power function the difference between "the composite vector current value (composite vector current value is)" described hereinbefore in conjunction with the first embodiment of the invention and the predetermined threshold value set for the overheat protection, which offers the similar effects as those described heretofore.

As is apparent from the foregoing, with the arrangement of the overheat protecting means 11, 11A and 11B according to the present invention, the proper overheat protection can be realized by limiting the motor current value(s) in dependence on the integrated value(s) of the function value(s) derived by fitting to the predetermined function the motor current values iu, iv and iw (or the transformed current values id and iq determined through the coordinate transformation to the orthogonal coordinate system).

By way of example, the overheat protecting means 11 (serving as the current parameter limiting means) of the motor control apparatus according to the first embodiment of the present invention (see FIG. 1) is so arranged as to limit the motor current value (or the composite vector current value is determined on the basis of the d-axis current value id and the q-axis current value iq) in dependence on the integrated value of the function value obtained by fitting the d-axis current value id and the q-axis current value iq arithmetically determined from the current command values id* and iq* to the predetermined function.

By virtue of this feature, proper overhead protection can be realized by limiting the target d- and q-axis currents in dependence on the integrated value of the predetermined function without being accompanied with any appreciable distortion of the motor current of sinusoidal waveform.

Further, by arithmetically determining the composite vector current value is on the basis of the absolute values of the target d- and q-axis currents, the load or overhead as involved in the arithmetic operation can be reduced.

Furthermore, the overheat protecting means 11 may be so arranged as to limit the d-axis current value id and the q-axis current value iq so that the current phase angle θ formed by the d-axis current value id and the q-axis current value iq can be maintained or alternatively limit the composite vector current value is with priority being put on either the d-axis current value id or the q-axis current value iq.

In this way, by preventing the current phase angle θ formed between the q-axis current and iq and the composite vector current of the d-axis current value id and the q-axis current value iq from changing around the limit value of the motor current, the motor current value can be limited while allowing the rotation speed (rpm) of the motor 1 and the output torque thereof to gradually decrease in balance.

Besides, by limiting the d-axis current value id, the q-axis current value iq or the composite vector current value of the d-axis current value id and the q-axis current value iq in dependence on the integrated value of the predetermined function, proper overheat protection can be realized even in the vector control of the polyphase motor.

At this juncture, it should also be added that the motor current limiting module 13d; 13q may also be so arranged as to limit the motor current value on the basis of one of the integrated values of the function values determined by fitting the motor current values, the d-axis current value id and the q-axis current value iq to the predetermined function, which one allows a larger motor current than a predetermined value to flow. Owing to this arrangement, the arithmetic processing can further be simplified.

Alternatively, the motor current limiting module 13d; 13q may be so arranged as to limit the motor current value in dependence on the integrated value of the function value obtained by fitting the composite vector value (composite vector current value is) on the coordinate system composed of the d-axis and the q-axis to a predetermined function.

By limiting the motor current value in dependence on the composite vector current value is, as mentioned above, those parts of the motor at which heat generation occurs most intensively can be protected against overheating without unbalancing the motor current values of the three phases.

Incidentally, the composite vector value can be expressed by a sum, a square sum, a vector sum or the like of the d- and q-axis current values. Alternatively, the composite vector value may be expressed by the greater current value of the d- and q-axis currents.

On the other hand, the overheat protecting means 11A of the motor control apparatus according to the second embodiment of the present invention (see FIG. 6) is so arranged as to limit the motor current values in dependence on the integrated values of the function values obtained by fitting the motor current values iu, iv and iw to a predetermined function.

In that case, the overheat protecting means 11A performs arithmetic operation on the basis of the detected values of the phase currents iu, iv and iw, respectively, to thereby limit the crest or peak vales of the phase currents iu, iv and iw. Thus, proper overheat protection can be realized.

Further, the overheat protecting means 11B of the motor control apparatus according to the third embodiment of the present invention (see FIG. 7) is so arranged as to limit the motor current value in dependence on the integrated values of the function values acquired by fitting the differences between the transformed current values id and iq derived through the coordinate transformation on one hand and the predetermined threshold value TH on the other hand to the predetermined function.

However, the overheat protecting means 11B may also be so designed as to limit the motor current values in dependence on the integrated values of the differences between the function values obtained by fitting the transformed current values id and iq to the predetermined function on one hand and the predetermined threshold value on the other hand.

The teachings of the present invention incorporated in the third embodiment may equally be applied to the motor control apparatus such as the open-loop control apparatus which is not provided with the detection circuits for the phase currents iu, iv and iw by performing the arithmetic operation in conformance with the target value.

By the way, the predetermined function adopted in the overheat protecting means 11, 11A and 11B of the motor control apparatus according to the first to third embodiments of the invention is represented typically by the power function which can be realized by polynomial approximation, polygonal-line approximation or table referencing.

By limiting the maximum value of the motor current value in dependence on the integrated value of the power function, the motor current is limited at an earlier time point when the motor current is large, while it is limited at a later time point when the motor current is small. Thus, the overheat protection which is very useful and suitable from the practical point of view can be realized.

Further, the practically useful overheat protection can equally be realized in the case where the maximum value of the motor current value is limited in dependence on the integrated values of the differences between the function values obtained by fitting the values of the phase currents iu, iv and iw to the power function and the predetermined threshold value.

Furthermore, by realizing the power function through arithmetic operation based on the polynomial approximation or polygonal-line approximation, the load or overhead involved in the arithmetic operation can be mitigated. The same holds true for the arithmetic operation for realizing the power function by the table referencing.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A motor control apparatus, comprising:
   current command value generating means for generating current command values for a motor having a polyphase winding assembly; and
   motor current value detecting means for detecting phase currents flowing through said motor as motor current values,
   said motor control apparatus being designed to drive said motor on the basis of at least said motor current values and said current command values,
   said motor control apparatus further comprising:
   current parameter limiting means for limiting current parameters relating to said motor current values under predetermined conditions,
   wherein said current parameter limiting means is designed to limit said current parameters in dependence on integrated values of function values determined by transformed current values determined through coordinate transformation of said motor current values.

2. A motor control apparatus according to claim 1, further comprising:
   torque control means for performing a torque control of said motor,
   wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and
   wherein said current parameter limiting means is designed to limit said motor current values in dependence on integrated values of function values determined by fitting said motor current values or alternatively a d-axis current value and a q-axis current value arithmetically determined on the basis of said current command values.

3. A motor control apparatus according to claim 2,
   wherein said current parameter limiting means is so designed as to limit said motor current values on the basis of one of integrated values of the function values obtained by fitting said d-axis current value and said q-axis current value to said predetermined function, wherein said one integrated value is so selected as to allow a larger current than a predetermined current quantity to flow through said motor.

4. A motor control apparatus according to claim 3,
   wherein said current parameter limiting means is so designed as to limit said motor current values in dependence on an integrated value of a function value obtained by fitting a composite vector value on a coordinate system composed of said d-axis and said q-axis to said predetermined function.

5. A motor control apparatus according to claim 4,
   wherein said composite vector value is represented by a vector sum of said d-axis current and said q-axis current.

6. A motor control apparatus according to claim 4,
   wherein said composite vector value is represented by a sum of said d-axis current and said q-axis current.

7. A motor control apparatus according to claim 4,
   wherein said composite vector value is represented by a square sum of said d-axis current and said q-axis current.

8. A motor control apparatus according to claim 4,
   wherein said composite vector value is represented by a larger current of said d-axis current and said q-axis current.

9. A motor control apparatus according to claim 1,
   further comprising:
   torque control means for performing a torque control of said motor,
   wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and
   wherein said current parameter limiting means is designed to limit a d-axis current value and a q-axis current value arithmetically determined on the basis of said motor current values in dependence on integrated values of function values determined by fitting said transformed current values to said predetermined function.

10. A motor control apparatus according to claim 1,
    further comprising:
    torque control means for performing a torque control of said motor,
    wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and
    wherein said current parameter limiting means is designed to limit a composite vector current value arithmetically determined on the basis of a d-axis current value and a q-axis current value arithmetically determined on the basis of said motor current values in dependence on integrated values of function values determined by fitting said transformed current values to said predetermined function.

11. A motor control apparatus according to claim 1, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a d-axis current value and a q-axis current value so as to maintain a phase angle formed between said d-axis current value and said q-axis current value arithmetically determined on the basis of said motor current values in dependence on integrated values of function values obtained by fitting said transformed current values to said predetermined function.

12. A motor control apparatus according to claim 1, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a composite vector current value with preference being put on either a d-axis current value or a q-axis current value arithmetically determined on the basis of said motor current values in dependence on integrated values of function values determined by fitting said transformed current values to said predetermined function.

13. A motor control apparatus according to claim 1, wherein said current parameter limiting means is so designed as to limit crest values of said phase currents in dependence on integrated values of function values determined by fitting said transformed current values to said predetermined function.

14. A motor control apparatus according to claim 1, wherein said current parameter limiting means is so designed as to limit said motor current values in dependence on integrated values of function values determined by fitting differences between said transformed current values and a predetermined threshold value to said predetermined function.

15. A motor control apparatus according to claim 1, wherein said current parameter limiting means is so designed as to limit said motor current values in dependence on integrated values of differences between function values determined by fitting said transformed current values to said predetermined function on one hand and a predetermined threshold value on the other hand.

16. A motor control apparatus according to claim 1, wherein said predetermined function is given by a power function.

17. A motor control apparatus according to claim 16, wherein said power function is realized by a polynomial approximation.

18. A motor control apparatus according to claim 16, wherein said power function is realized by a polygonal-line approximation.

19. A motor control apparatus according to claim 16, wherein said power function is realized by table referencing.

20. A motor control apparatus, comprising:

current command value generating means for generating current command values for a motor having a polyphase winding assembly; and motor current value detecting means for detecting phase currents flowing through said motor as motor current values, said motor control apparatus being designed to drive said motor on the basis of at least said motor current values and said current command values, said motor control apparatus further comprising:

current parameter limiting means for limiting current parameters relating to said motor current values under predetermined conditions related to overheating, wherein said current parameter limiting means is designed to limit said current parameters in dependence on integrated values of function values determined by fitting said motor current values to a predetermined function.

21. A motor control apparatus according to claim 20, wherein said predetermined function is given by a power function.

22. A motor control apparatus according to claim 21, wherein said power function is realized by a polynomial approximation.

23. A motor control apparatus according to claim 21, wherein said power function is realized by a polygonal-line approximation.

24. A motor control apparatus according to claim 21, wherein said power function is realized by table referencing.

25. A motor control apparatus, comprising:

current command value generating means for generating current command values for a motor having a polyphase winding assembly; and motor current value detecting means for detecting phase currents flowing through said motor as motor current values, said motor control apparatus being designed to drive said motor on the basis of at least said motor current values and said current command values, said motor control apparatus further comprising:

current parameter limiting means for limiting current parameters relating to said motor current values under predetermined conditions, wherein said current parameter limiting means is designed to limit said current parameters in dependence on integrated values of function values determined by transformed current values determined through coordinate transformation of said current command values.

26. A motor control apparatus according to claim 25, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit said motor current values in dependence on integrated values of function values determined by fitting said motor current values or alternatively a d-axis current value and a q-axis current value arithmetically determined on the basis of said current command values.

27. A motor control apparatus according to claim 26, wherein said current parameter limiting means is so designed as to limit said motor current values on the basis of one of integrated values of the function values obtained by fitting said d-axis current value and said q-axis current value to said predetermined function, wherein said one integrated value is so selected as to allow a larger current than a predetermined current quantity to flow through said motor.

28. A motor control apparatus according to claim 27, wherein said current parameter limiting means is so designed as to limit said motor current values in dependence on an integrated value of a function value obtained by fitting a composite vector value on a coordinate system composed of said d-axis and said q-axis to said predetermined function.

29. A motor control apparatus according to claim 28, wherein said composite vector value is represented by a vector sum of said d-axis current and said q-axis current.

30. A motor control apparatus according to claim 28, wherein said composite vector value is represented by a sum of said d-axis current and said q-axis current.

31. A motor control apparatus according to claim 28, wherein said composite vector value is represented by a square sum of said d-axis current and said q-axis current.

32. A motor control apparatus according to claim 28, wherein said composite vector value is represented by a larger current of said d-axis current and said q-axis current.

33. A motor control apparatus according to claim 25, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a d-axis current value and a q-axis current value arithmetically determined on the basis of said current command values in dependence on integrated values of function values determined by fitting said transformed current values to said predetermined function.

34. A motor control apparatus according to claim 25, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a composite vector current value arithmetically determined on the basis of a d-axis current value and a q-axis current value arithmetically determined on the basis of said current command values in dependence on integrated values of function values determined by fitting said transformed current values to said predetermined function.

35. A motor control apparatus according to claim 25, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a d-axis current value and a q-axis current value so as to maintain a phase angle formed between said d-axis current value and said q-axis current value arithmetically determined on the basis of said current command values in dependence on integrated values of function values obtained by fitting said transformed current values to said predetermined function.

36. A motor control apparatus according to claim 25, further comprising:

torque control means for performing a torque control of said motor, wherein said torque control means being so designed as to generate a torque command for said motor to thereby control an output torque of said motor in conformance with said torque command by resorting to a vector control which can be described with a two-phase rotation flux coordinate system composed of a d-axis and a q-axis, said d-axis extending in a direction in which a field current of said motor flows while said q-axis extends in a direction orthogonal to said d-axis, and wherein said current parameter limiting means is designed to limit a composite vector current value with preference being put on either a d-axis current value or a q-axis current value arithmetically determined on the basis of said current command values in dependence on integrated values of function values determined by fitting said transformed current values to said predetermined function.

37. A motor control apparatus according to claim 25, wherein said current parameter limiting means is so designed as to limit crest values of said phase currents in dependence on integrated values of function values determined by fitting said transformed current values to said predetermined function.

38. A motor control apparatus according to claim 25, wherein said current parameter limiting means is so designed as to limit said motor current values in dependence on integrated values of function values determined by fitting differences between said transformed current values and a predetermined threshold value to said predetermined function.

39. A motor control apparatus according to claim 25, wherein said current parameter limiting means is so designed as to limit said motor current values in dependence on integrated values of differences between function values determined by fitting said transformed current values to said predetermined function on one hand and a predetermined threshold value on the other hand.

40. A motor control apparatus according to claim 25, wherein said predetermined function is given by a power function.

41. A motor control apparatus according to claim 40, wherein said power function is realized by a polynomial approximation.

42. A motor control apparatus according to claim 40, wherein said power function is realized by a polygonal-line approximation.

43. A motor control apparatus according to claim 40, wherein said power function is realized by table referencing.

* * * * *